(12) United States Patent
Katayama

(10) Patent No.: US 7,958,778 B2
(45) Date of Patent: Jun. 14, 2011

(54) MULTIPLE CYLINDER INTERNAL COMBUSTION ENGINE MISFIRING CYLINDER IDENTIFYING APPARATUS AND MISFIRING CYLINDER IDENTIFYING METHOD

(75) Inventor: Akihiro Katayama, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 171 days.

(21) Appl. No.: 12/255,717

(22) Filed: Oct. 22, 2008

(65) Prior Publication Data

US 2009/0107224 A1  Apr. 30, 2009

(30) Foreign Application Priority Data

Oct. 26, 2007  (JP) .................................. 2007-278853

(51) Int. Cl.
*G01M 15/11* (2006.01)
(52) U.S. Cl. .................................. 73/114.04; 73/114.02
(58) Field of Classification Search .............. 73/114.04, 73/114.02
See application file for complete search history.

(56) References Cited

U.S. PATENT DOCUMENTS

| | | | | |
|---|---|---|---|---|
| 5,699,252 A | * | 12/1997 | Citron et al. ................... 701/111 |
| 5,808,186 A | * | 9/1998 | Matsumoto et al. .......... 73/114.03 |
| 6,062,071 A | * | 5/2000 | Henn et al. ................... 73/114.04 |
| 6,732,042 B2 | * | 5/2004 | Katayama ..................... 701/110 |
| 7,480,591 B2 | * | 1/2009 | Shikama et al. ............... 702/182 |
| 7,503,208 B2 | * | 3/2009 | Akimoto et al. ............. 73/114.03 |
| 7,536,902 B2 | * | 5/2009 | Tsukamoto et al. ........ 73/114.04 |
| 7,607,345 B2 | * | 10/2009 | Katayama .................. 73/114.02 |
| 7,614,290 B2 | * | 11/2009 | Shikama et al. ........... 73/114.25 |
| 7,712,356 B2 | * | 5/2010 | Suzuki ....................... 73/114.04 |
| 2003/0225504 A1 | * | 12/2003 | Katayama ..................... 701/110 |
| 2007/0157713 A1 | * | 7/2007 | Tsukamoto et al. .......... 73/117.3 |
| 2008/0148835 A1 | * | 6/2008 | Akimoto et al. ............ 73/116.01 |
| 2009/0063024 A1 | * | 3/2009 | Katayama ..................... 701/111 |
| 2010/0071448 A1 | * | 3/2010 | Akimoto et al. ............ 73/114.04 |

FOREIGN PATENT DOCUMENTS

| | | |
|---|---|---|
| JP | 5-18311 A | 1/1993 |
| JP | 07-119532 A | 5/1995 |
| JP | 08-028339 A | 1/1996 |
| JP | 10-148153 A | 6/1998 |
| JP | 10-318033 A | 12/1998 |
| JP | 2001-065402 A | 3/2001 |
| JP | 2003-343340 A | 12/2003 |
| JP | 2005-337021 A | 12/2005 |
| JP | 2007-198304 A | 8/2007 |
| WO | WO 2006112544 A1 * | 10/2006 |

\* cited by examiner

*Primary Examiner* — Freddie Kirkland, III
(74) *Attorney, Agent, or Firm* — Sughrue Mion, PLLC

(57) ABSTRACT

A misfiring cylinder identifying apparatus for a multiple cylinder internal combustion engine is provided with a determining portion that determines whether a plurality of cylinders is misfiring, and an identifying portion that identifies two cylinders among the plurality of cylinders in the order of the revolution speed fluctuation from largest as the misfiring cylinders when it is determined that the plurality of cylinders is misfiring.

12 Claims, 7 Drawing Sheets

F I G . 3
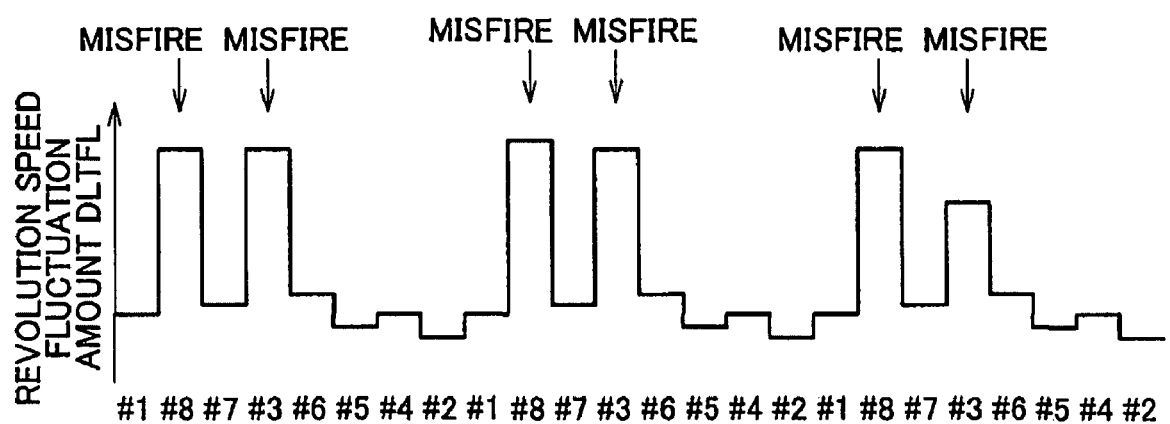

MULTIPLE CYLINDER INTERNAL COMBUSTION ENGINE MISFIRING CYLINDER IDENTIFYING APPARATUS AND MISFIRING CYLINDER IDENTIFYING METHOD

INCORPORATION BY REFERENCE

The disclosure of Japanese Patent Application No. 2007-278853 filed on Oct. 26, 2007, including the specification, drawings and abstract is incorporated herein by reference in its entirety.

BACKGROUND OF THE INVENTION

1. Field of the invention

The invention relates to an apparatus and method for identifying a misfiring cylinder(s) in a multiple cylinder internal combustion engine.

2. Description of the Related Art

When misfiring occurs in a multiple cylinder internal combustion engine, not only is there a fluctuation in torque but the fuel supplied to the cylinder that is misfiring is discharged as it is, which adversely affects exhaust emissions. Therefore, when there is a misfire, the supply of fuel to the cylinder that is misfiring is stopped in an attempt to prevent emissions from becoming worse. In order to halt the misfiring cylinder, however, it is necessary to identify which cylinder is misfiring.

A misfiring cylinder is typically identified by counting the number of times the revolution speed fluctuation amount exceeds a specified misfire determining value and specifying the cylinder with greatest number of times counted as the misfiring cylinder, as is described in Japanese Patent Application Publication No. 5-18311 (JP-A-5-18311), for example. This method can be effective for identifying a misfiring cylinder when a single cylinder is misfiring.

However, when a plurality of cylinders misfires simultaneously, it is difficult to effectively identify the misfiring cylinders using that method alone. Therefore, a misfiring cylinder identifying apparatus that can identify a misfiring cylinder(s) even when a plurality of cylinders misfires simultaneously has been proposed in Japanese Patent Application Publication No. 2003-343340 (JP-A-2003-343340) or Japanese Patent Application Publication No. 10-318033 (JP-A-10-318033). For example, the apparatus described in JP-A-2003-343340 identifies the misfiring cylinder(s) by determining whether a single cylinder is misfiring, two consecutive cylinders are misfiring, or two intermittent cylinders are misfiring from the revolution speed fluctuation pattern. Also, the apparatus described in JP-A-10-318033 identifies the misfiring cylinder(s) by determining whether a single cylinder is misfiring, two consecutive cylinders are misfiring, or two intermittent cylinders are misfiring from the revolution speed fluctuation pattern of three consecutive cylinders in the firing order.

When identifying a misfiring cylinder based on the revolution speed fluctuation pattern as described in the related art in an internal combustion engine with a small number of cylinders, such as six or less for example, the misfiring cylinder(s) can be appropriately identified. However, it becomes more difficult to appropriately identify the misfiring cylinder(s) with the related art described above as the number of cylinders increases. This is because the number of possible misfiring cylinder combinations increases exponentially as the number of cylinders increases. For example, when no more than two cylinders misfire simultaneously, the possible misfiring cylinder combinations is 10 in a four-cylinder internal combustion engine, 21 in a six-cylinder internal combustion engine, and 36 in an eight-cylinder internal combustion engine. Moreover, the number of possible misfiring cylinder combinations increases even more when three or more cylinders misfire simultaneously.

In order to identify a misfiring cylinder(s) based on revolution speed fluctuation pattern matching as in the related art described above, it is necessary to obtain the revolution speed fluctuation pattern for each possible misfiring cylinder combination beforehand, and reference all of the obtained revolution speed fluctuation patterns. Therefore, as the number of cylinders increases, so too does the number of revolution speed fluctuation patterns that must be obtained beforehand, and the misfiring cylinder identifying logic becomes complicated. Accordingly, in an internal combustion engine with a large number of cylinders it is difficult to identify misfiring cylinders based only on revolution speed fluctuation pattern matching as in the related art described above.

SUMMARY OF THE INVENTION

This invention thus provides a multiple cylinder internal combustion engine misfiring cylinder identifying apparatus and misfiring cylinder identifying method capable of identifying misfiring cylinders in a multiple cylinder internal combustion engine with relatively simple logic.

A first aspect of the invention relates to a misfiring cylinder identifying apparatus for a multiple cylinder internal combustion engine. This misfiring cylinder identifying apparatus includes a determining portion that determines whether a plurality of cylinders is misfiring; and an identifying portion that identifies two cylinders among the plurality of cylinders in the order of the revolution speed fluctuation from largest as the misfiring cylinders when it is determined that the plurality of cylinders is misfiring.

A second aspect of the invention also relates to a misfiring cylinder identifying apparatus for a multiple cylinder internal combustion engine. This misfiring cylinder identifying apparatus includes a determining portion that determines the number of misfiring cylinders; and a identifying portion that identifies cylinders corresponding to the number of misfiring cylinders in the order of the revolution speed fluctuation from largest as the misfiring cylinders when it is determined that a plurality of cylinders is misfiring.

A third aspect of the invention relates to a method for identifying a misfiring cylinder in a multiple cylinder internal combustion engine. This method includes determining whether a plurality of cylinders is misfiring; and identifying two cylinders among the plurality of cylinders in the order of the revolution speed fluctuation from largest as the misfiring cylinders when it is determined that the plurality of cylinders is misfiring.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a time chart illustrating a change in the revolution speed fluctuation amount when two cylinders are misfiring;

DETAILED DESCRIPTION OF EMBODIMENTS

Hereinafter, a first example embodiment of the invention will be described in detail with reference to FIGS. 1 to 4. In this example embodiment, the invention is applied to a V-type eight-cylinder internal combustion engine with two banks of four cylinders each, i.e., four cylinders in a left bank and four cylinders in a right bank.

Figure 1:
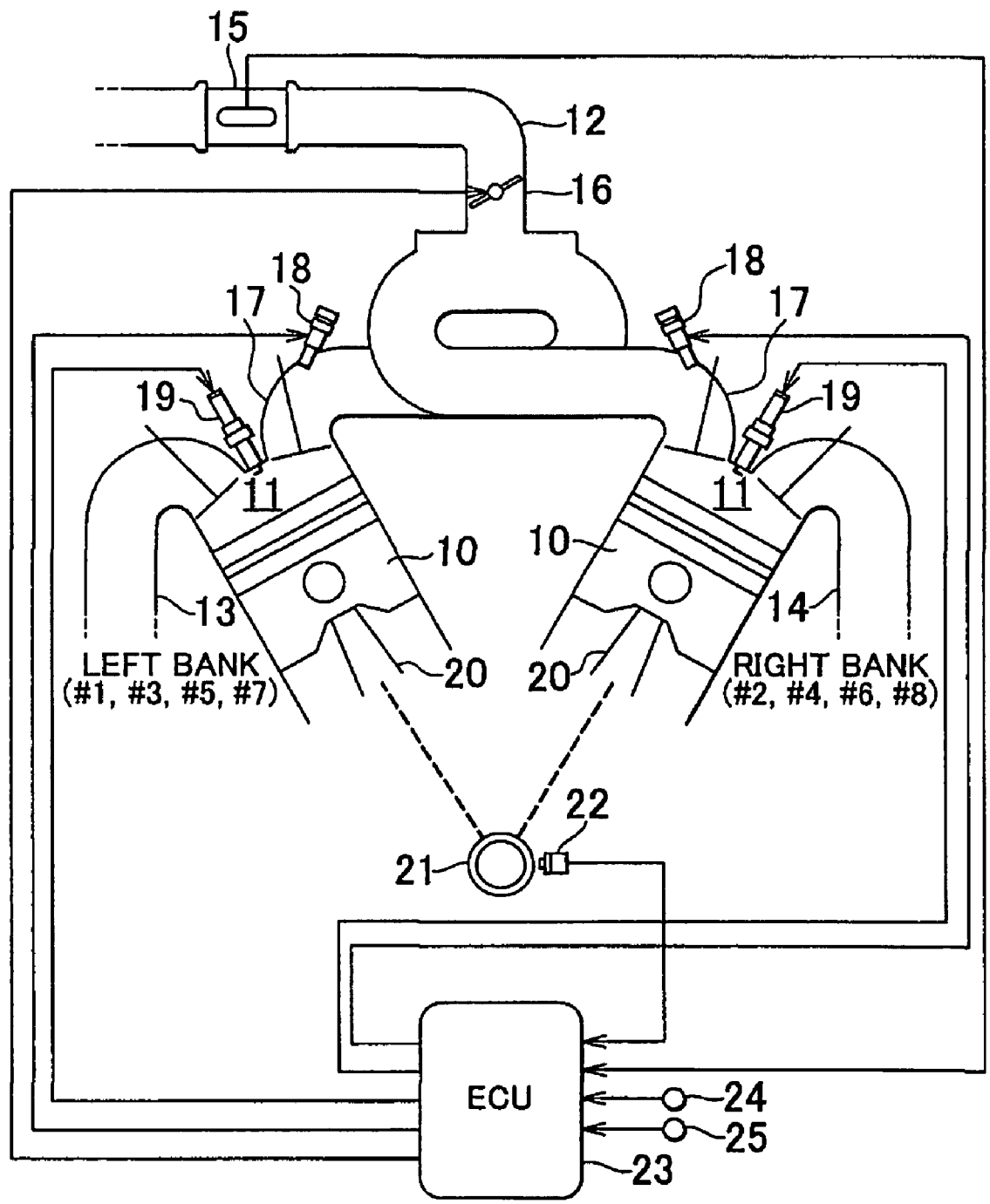
FIG. 1 is a schematic view of the overall structure of a multiple cylinder internal combustion engine misfiring cylinder identifying apparatus according to a first example embodiment of the invention.

FIG. 1 shows the overall structure of a misfiring cylinder identifying apparatus according to the first example embodiments in the internal combustion engine shown in FIG. 1, a first cylinder #1, a third cylinder #3, a fifth cylinder #5, and a seventh cylinder #7 are arranged in order from the front in the left bank, and a second cylinder #2, a fourth cylinder #4, a sixth cylinder #6, and an eighth cylinder #8 are arranged in order from the front in the right bank. Incidentally, in this case, the firing order in the internal combustion engine is as follows: first cylinder #1→eighth cylinder #8→seventh cylinder #7→third cylinder #3→sixth cylinder #6→fifth cylinder #5→fourth cylinder #4→second cylinder #2.

As shown in FIG. 1, cylinders #1 to #8 of the internal combustion engine each have a piston 10, which can move vertically, arranged therein, and a combustion chamber 11 above the piston 10. An intake passage 12 and an exhaust passage 13 and 14 are connected to the combustion chamber 11 of each cylinder #1 to #8.

An airflow meter 15 that detects the amount of intake air, and a throttle valve 16 that regulates the amount of intake air by adjusting its opening amount are provided in the intake passage 12 of the internal combustion engine. The intake passage 12 is connected to the combustion chamber 11 of each cylinder #1 to #8 via an intake port 17 formed in the cylinder heads of the left and right banks.

A fuel injector 18 that injects fuel is arranged in the intake port 17 of each cylinder #1 to #8. Also, at the top of each cylinder #1 to #8 is a spark plug 19 that ignites a mixture of air introduced through the intake passage 12 and fuel injected from the fuel injector 18 by spark discharge.

The piston 10 of each cylinder #1 to #8 is connected to a crankshaft 21, i.e., an engine output shaft via a connecting rod 20. A crank position sensor 22 that detects the rotation phase of the crankshaft 21 is provided near the crankshaft 21.

The internal combustion engine is controlled by an electronic control unit (ECU) 23. This ECU 23 includes a central processing unit (CPU) that executes various computations related to control of the internal combustion engine, read only memory (ROM) in which control programs and data are stored, random access memory (RAM) that temporarily stores the results of the calculations performed by the CPU and the like, and an input/output port (I/O) that sends and receives signals to and from other devices, and the like. The ECU 23 receives signals from various sensors such as the airflow meter 15 and the crank position sensor 22, as well as an accelerator sensor 24 that detects the operation amount of an accelerator, and a vehicle speed sensor 25 that detects the vehicle speed. The ECU 23 also outputs command signals to various devices such as the throttle valve 16, the fuel injectors 18, and the spark plugs 19 based on the input sensor signals, and performs various control such as opening amount control of the throttle valve 16, fuel injection control of the fuel injectors 18, and ignition timing control of the spark plugs 19 and the like.

Continuing on, as part of the engine control the ECU 23 of the misfiring cylinders internal combustion engine structured as described above checks whether there is a misfire, and if so, identifies which cylinder(s) is misfiring while the engine is running. Next, the process related to identifying the misfiring cylinder(s) that is executed by the ECU 23 in this example embodiment will be described in detail.

The ECU 23 continuously calculates the revolution speed fluctuation amount of each cylinder #1 to #8 while the engine is running. This calculation is performed in the following manner That is, each time a cylinder #1 to #8 fires, the ECU 23 measures the time A(i) that it takes for the crankshaft 21 to rotate from 0° C. A to 30° C. A and the time B(i) that it takes for the crankshaft 21 to rotate from 90° C. A to 120° C. A based on the detection results from the crank position sensor 22 when compression top-dead-center (TDC) is the reference 0° C. A. In this case, the time A(i) is measured as the time that it takes the crankshaft 21 to rotate 30° C. A at maximum rotation speed, and the time B(i) is the time measured as the time that it takes the crankshaft 21 to rotate 30° C. A at maximum rotation speed.

Then the ECU 23 obtains the difference between the time B(i) and the time A(i) (i.e., B(i)−A(i)) and subtracts the difference between those times in the cylinder immediately before that cylinder in the firing order (i.e., B(i−1)−A(i−1)) from that difference to obtain the revolution speed fluctuation amount DLTFL of that cylinder as shown in Equation 1 below.

$$DLTFL = (B(i)-A(i)) - (B(i-1)-A(i-1)) \quad \text{[Equation 1]}$$

At the same time that the ECU 23 checks to determine whether any of the cylinders are misfiring, the ECU 23 also determines whether a single cylinder is misfiring or a plurality of cylinders is misfiring based on the thus obtained revolution speed fluctuation amount of each cylinder #1 to #8. Both the check to determine whether or not a cylinder(s) is misfiring and the identification of a misfiring cylinder(s) are performed based on the revolution speed fluctuation pattern of the cylinders #1 to #8 as described below.

Figure 2A:
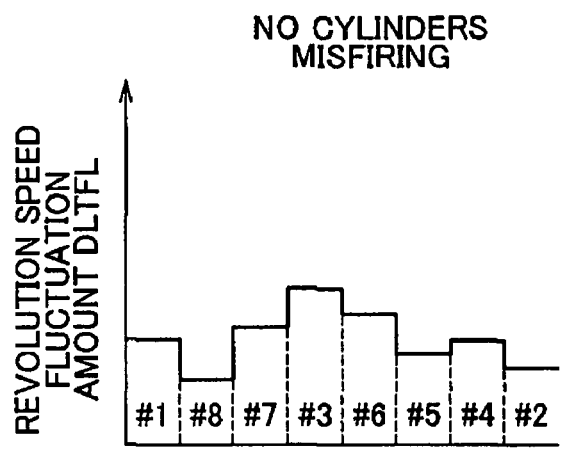
FIG. 2A is a graph showing an example of a revolution speed fluctuation pattern when no cylinders are misfiring.

FIG. 2A shows an example of the revolution speed fluctuation pattern of the cylinders #1 to #8 when none of the cylinders are misfiring. As shown in FIG. 2A, although it varies somewhat, the revolution speed fluctuation amount DLTFL of each cylinder #1 to #8 at this time is small.

Figure 2B:
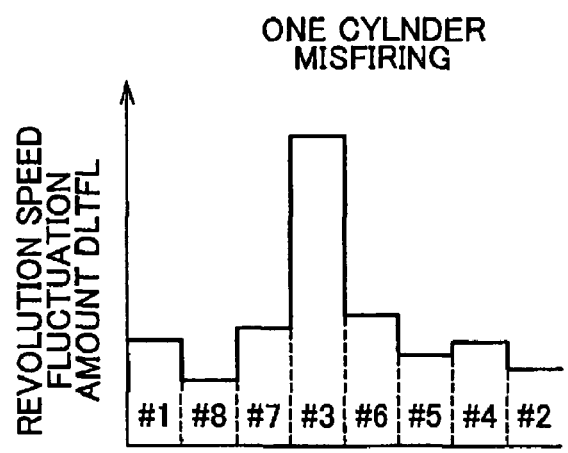
FIG. 2B is a graph showing an example of a revolution speed fluctuation pattern when a single cylinder is misfiring.

On the other hand, FIG. 2B shows an example of a revolution speed fluctuation pattern when a single cylinder is misfiring, i.e., when misfiring occurs in only one of the cylinders. As shown in FIG. 2B, the revolution speed fluctuation amount DLTFL of the misfiring cylinder (i.e., the third cylinder #3 in FIG. 2B) is much larger than the revolution speed fluctuation amounts DLTFL of the other cylinders.

Figure 2C:
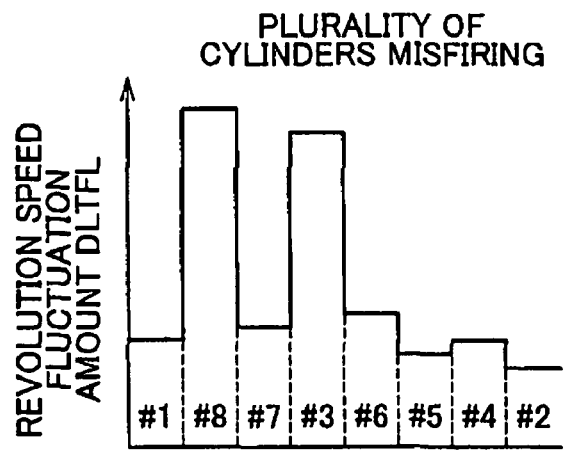
FIG. 2C is a graph showing an example of a revolution speed fluctuation pattern when a plurality of cylinders is misfiring.

Moreover, FIG. 2C shows an example of a revolution speed fluctuation pattern when a plurality of cylinders is misfiring. As shown in FIG. 2C, the revolution speed fluctuation amounts DLTFL of the misfiring cylinders (i.e., the third cylinder #3 and the eighth cylinder #8 in FIG. 2C) are much larger than the revolution speed fluctuation amounts DLTFL of the other cylinders. Incidentally, the revolution speed fluctuation pattern when a plurality of cylinders is misfiring may change in ways other than that shown in FIG. 2C depending on the combination of misfiring cylinders.

The ECU 23 determines whether none, one, or a plurality of cylinders is misfiring by the revolution speed fluctuation pattern of the cylinders #1 to #8. That is, if all of the revolution speed fluctuation amounts DLTFL of the cylinders #1 to #8 are small, the ECU 23 determines that none of the cylinders are misfiring. If the revolution speed fluctuation amount DLTFL of a single cylinder is much higher than the rest, the ECU 23 determines that one of the cylinders is misfiring. Also, if the revolution speed fluctuation amount DLTFL of at least one cylinder is large and the revolution speed fluctuation pattern is not a revolution speed fluctuation pattern in which the revolution speed fluctuation amount DLTFL for only one cylinder is much higher than the rest, as is the case when only one cylinder is misfiring, the ECU 23 determines that a plurality of cylinders is misfiring.

As described above, in an internal combustion engine with a large number of cylinders, a variety of misfiring cylinder combinations are possible so it is difficult to identify the misfiring cylinders based solely on the revolution speed fluctuation pattern of the cylinders. However, the determination as to whether only one cylinder is misfiring or a plurality of cylinders is misfiring can easily be made as described above.

If the ECU 23 determines that only one cylinder is misfiring, the ECU 23 then identifies the misfiring cylinder in the following manner. That is, the ECU 23 counts the number of times the revolution speed fluctuation amount DLTFL exceeds a specified misfire determining value LVMF for each cylinder during a specified number of cycles, and identifies the cylinder for which the number of times counted is greatest as the misfiring cylinder. In this case, the misfiring cylinder is identified after counting is performed during a period of 100 combustion cycles in each cylinder #1 to #8, i.e., during a period of 100 revolutions (rev) of the crankshaft 21.

Meanwhile, if the ECU 23 determines that a plurality of cylinders is misfiring, the ECU 23 identifies the misfiring cylinders in the following manner. Incidentally, in this example embodiment, simultaneous misfiring in three or more cylinders can be stochastically ignored so at this time it is considered that two cylinders are misfiring. The two misfiring cylinders are identified by obtaining an integrated value of the revolution speed fluctuation amount DLTFL in a specified number of cycles for each cylinder and determining the magnitude of the revolution speed fluctuation of each cylinder by the amount of that integrated value. More specifically, for each cylinder #1 to #8, the ECU 23 calculates the integrated value of the revolution speed fluctuation amount DLTFL in 100 combustion cycles and identifies the two cylinders with the largest integrated values as the misfiring cylinders.

FIG. 3 shows an example of change in the revolution speed fluctuation amount DLTFL of each cylinder #1 to #8 when two cylinders are misfiring. As shown in FIG. 3, when there are misfiring cylinders (e.g., the third cylinder #3 and the eighth cylinder #8 in the example shown in FIG. 3), the revolution speed fluctuation amounts DLTFL of those cylinders increase. In this case, even if the degree of increase in the revolution speed fluctuation amounts DLTFL of the misfiring cylinders varies somewhat in each combustion cycle, or even if misfiring in those cylinders occurs intermittently, the integrated values of the revolution speed fluctuation amounts DLTFL of the misfiring cylinders in a set number of combustion cycles or more will become statistically larger than the corresponding integrated values of non-misfiring cylinders. Therefore, if it is determined that two cylinders are misfiring, it is possible to identify those misfiring cylinders by the method described above.

Figure 4:
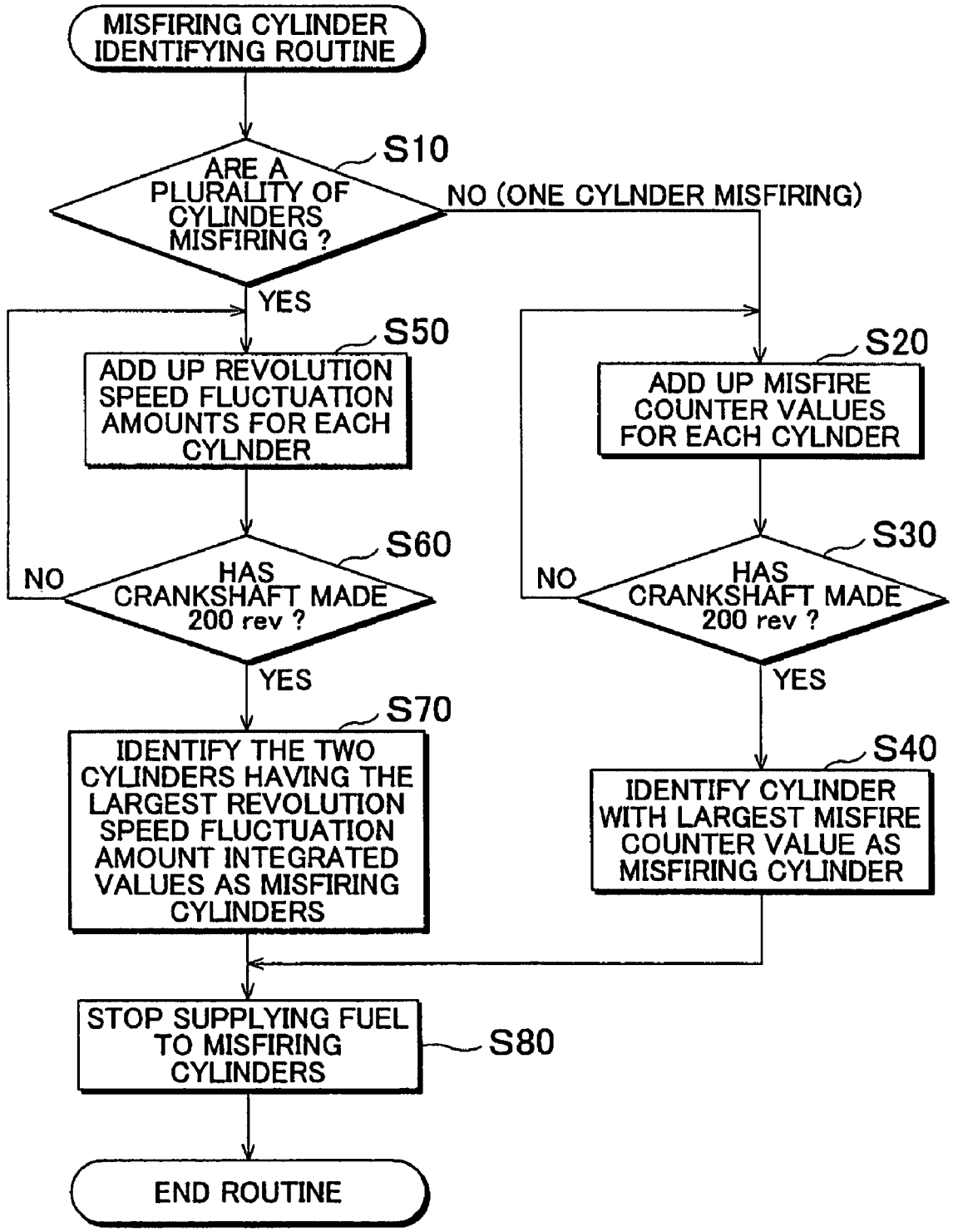
FIG. 4 is a flowchart of a misfiring cylinder identifying routine employed in the first example embodiment.

FIG. 4 is a flowchart illustrating a misfiring cylinder identifying routine employed in this example embodiment. This routine is executed by the ECU 23 when it is confirmed that a cylinder(s) is misfiring.

When the routine starts, the ECU 23 first determines in step S80 whether a single cylinder is misfiring or a plurality of cylinders is misfiring based on the revolution speed fluctuation pattern in the manner described above. If it is determined that a single cylinder is misfiring, then in steps S20 and S30 the ECU 23 adds up (integrates) misfire counter values for each cylinder, i.e., counts the number of times the revolution speed fluctuation amount DLTFL exceeds the specified misfire determining value LVMF for each cylinder, during 200 revolutions (rev) of the crankshaft 21. Then in step S40, the ECU 23 identifies the misfiring cylinder based on the results from those steps. More specifically, the ECU 23 at this time identifies the cylinder with the highest misfire counter value as the misfiring cylinder. Then in step S80, the ECU 23 stops supplying fuel to the identified misfiring cylinder and this cycle of the routine ends.

If, on the other hand, it is determined in step S10 that a plurality of cylinders is misfiring, then in steps S50 and S60 the ECU 23 adds up the revolution speed fluctuation amounts DLTFL of each cylinder #1 to #8 during 200 revolutions (rev) of the crankshaft 21. That is, the ECU 23 at this time calculates the integrated value of the revolution speed fluctuation amount DLTFL during 200 revolutions of the crankshaft 21 for each cylinder. Next in step S70, the ECU 23 identifies the two cylinders with the highest calculated integrated values as the misfiring cylinders. Then in step S80, the ECU 23 stops supplying fuel to the identified misfiring cylinders and this cycle of the routine ends.

In the example embodiment described above, the process performed by the ECU 23 in step S10 of the misfiring cylinder identifying routine may be regarded as a process performed by "determining means for determining whether a plurality of cylinders is misfiring" of the invention. Also, the processes performed by the ECU 23 in steps S50 to S70 of the misfiring cylinder identifying routine may be regarded as processes performed by "identifying means for identifying the two cylinders having the largest revolution speed fluctuation amounts as the misfiring cylinders when it is determined that a plurality of cylinders is misfiring" of the invention.

The multiple cylinder internal combustion engine misfiring cylinder identifying apparatus according to this example embodiment described above yields the following effects. First, in this example embodiment, the ECU 23 determines whether a single cylinder is misfiring or a plurality of cylinders is misfiring. When it is determined that a plurality of cylinders is misfiring, the ECU 23 identifies the misfiring cylinders in the order of the revolution speed fluctuation from largest. That is, in this example embodiment, when identifying the misfiring cylinders, the ECU 23 first only determines whether a single cylinder is misfiring or a plurality of cylinders is misfiring. The determination as to whether a single cylinder is misfiring or a plurality of cylinders is misfiring can be made relatively easily if not identify the misfiring cylinder(s). If it is determined that a plurality of cylinders is misfiring, simultaneous misfiring in three or more cylinders can be stochastically ignored so it is considered that two cylinders are misfiring. Once it is determined that two cylinders are misfiring, the misfiring cylinders can be easily identified by the magnitude of the revolution speed fluctuation of each cylinder. With this example embodiment, by first determining whether only one cylinder is misfiring or a plurality of cylinders is misfiring and then identifying the misfiring cylinder(s), i.e., by performing these steps separately in this way, it is possible to identify a misfiring cylinder(s) using only simple logic, regardless of whether a single cylinder is misfiring or two cylinders are misfiring. Therefore this example embodiment makes it possible to identify a misfiring cylinder(s) in a multiple cylinder internal combustion engine using only relatively simple logic.

Also, in this example embodiment, the ECU 23 obtains the integral value of the revolution speed fluctuation amount in a specified number of cycles and determines the magnitude of the revolution speed fluctuation amount of each cylinder by the size of that integrated value. Accordingly, the misfiring cylinders when a plurality of cylinders is misfiring can be identified using the simple logic of obtaining the integrated values of the revolution speed fluctuation amounts and identifying the two cylinders with the largest integrated values as the misfiring cylinders.

Further, in this example embodiment, if it is determined that only one cylinder is misfiring, the ECU 23 counts the number of times the revolution speed fluctuation amount has exceeded the specified misfire determining value LVMF for each cylinder during the specified number of cycles, and identifies the cylinder with the highest number of times counted as the misfiring cylinder. Therefore, the misfiring cylinder when only one cylinder is misfiring can be identified with simple logic.

Hereinafter, a second example embodiment of the invention will be described focusing mainly on the points which differ from the first example embodiment described above. Incidentally, constituent elements in the second example embodiment that are the same as or similar to those in the first example embodiment described above will be denoted by the same reference numerals and detailed descriptions of those constituent elements will be omitted.

In the first example embodiment, the integrated value of the revolution speed fluctuation amount DLTFL in a specified number of cycles is obtained for each cylinder. Then the magnitude of the revolution speed fluctuation of each cylinder is determined by the size of the integrated values, and the two cylinders with the largest integrated value are identified as the misfiring cylinders. In the second example embodiment, the number of times that the revolution speed fluctuation amount DLTFL exceeds the specified misfire determining value LVMF is counted for each cylinder, and the magnitude of the revolution speed fluctuation of each cylinder is determined by the number of times counted. The two cylinders having the largest magnitudes are identified as the misfiring cylinders. More specifically, a misfire counter is set for each cylinder and it is determined for each combustion cycle whether the revolution speed fluctuation amount DLTFL exceeds the misfire determining value LVMF. When the revolution speed fluctuation amount DLTFL exceeds the misfire determining value LVMF, the value of the misfire counter for that cylinder increases by 1. After this process is executed for 200 revolutions (rev) of the crankshaft 21, the values of the misfire counters of the cylinders are compared and the two cylinders with the highest values are identified as the misfiring cylinders.

Figure 5:
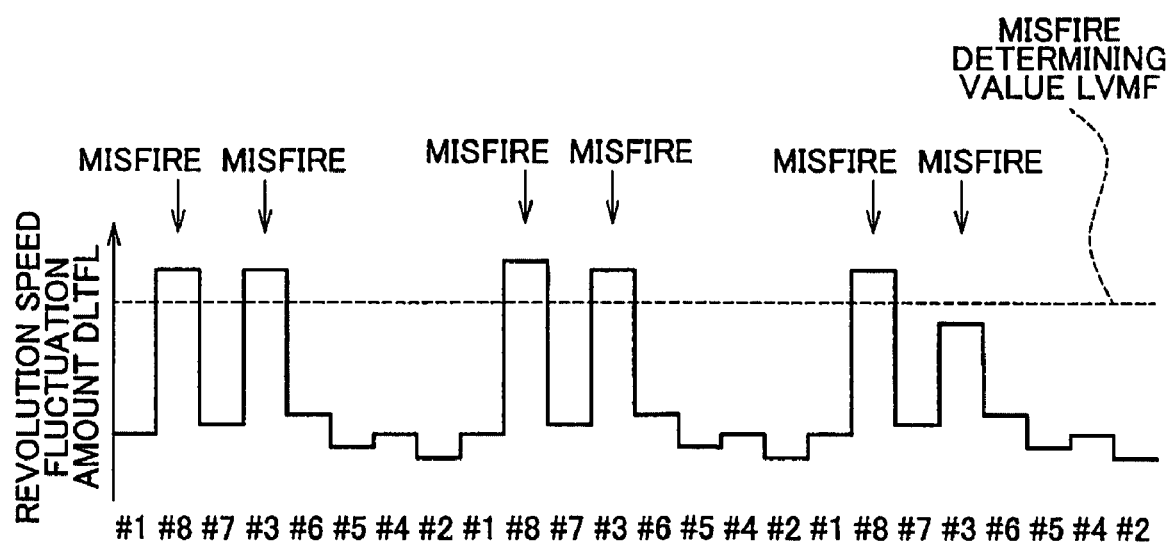
FIG. 5 is a time chart illustrating a change in the revolution speed fluctuation amount when two cylinders are misfiring.

FIG. 5 is a graph showing an example of a shift in the revolution speed fluctuation amount DLTFL of the cylinders #1 to #8 when two cylinders are misfiring. As shown in FIG. 5, when there are misfiring cylinders (e.g., the third cylinder #3 and the eighth cylinder #8 in the example shown in FIG. 5), the revolution speed fluctuation amounts DLTFL of those misfiring cylinders increase. In this case, the values of the misfire counters of those cylinders increase incrementally each time the values of the revolution speed fluctuation amounts DLTFL exceed the specified misfire determining value LVMF. Incidentally, even in a misfiring cylinder, the value of the revolution speed fluctuation amount DLTFL may be equal to or below the misfire determining value LVMF depending on the combustion cycle. Also, misfiring may also occur only intermittently. In this case as well, the value of the misfire counter of the misfiring cylinder in a set number of combustion cycles or more statistically increases compared with the value of the misfire counter of a non-misfiring cylinder. Therefore, if it is known that two cylinders are misfiring, those misfiring cylinders can be identified in the manner described above.

Figure 6:
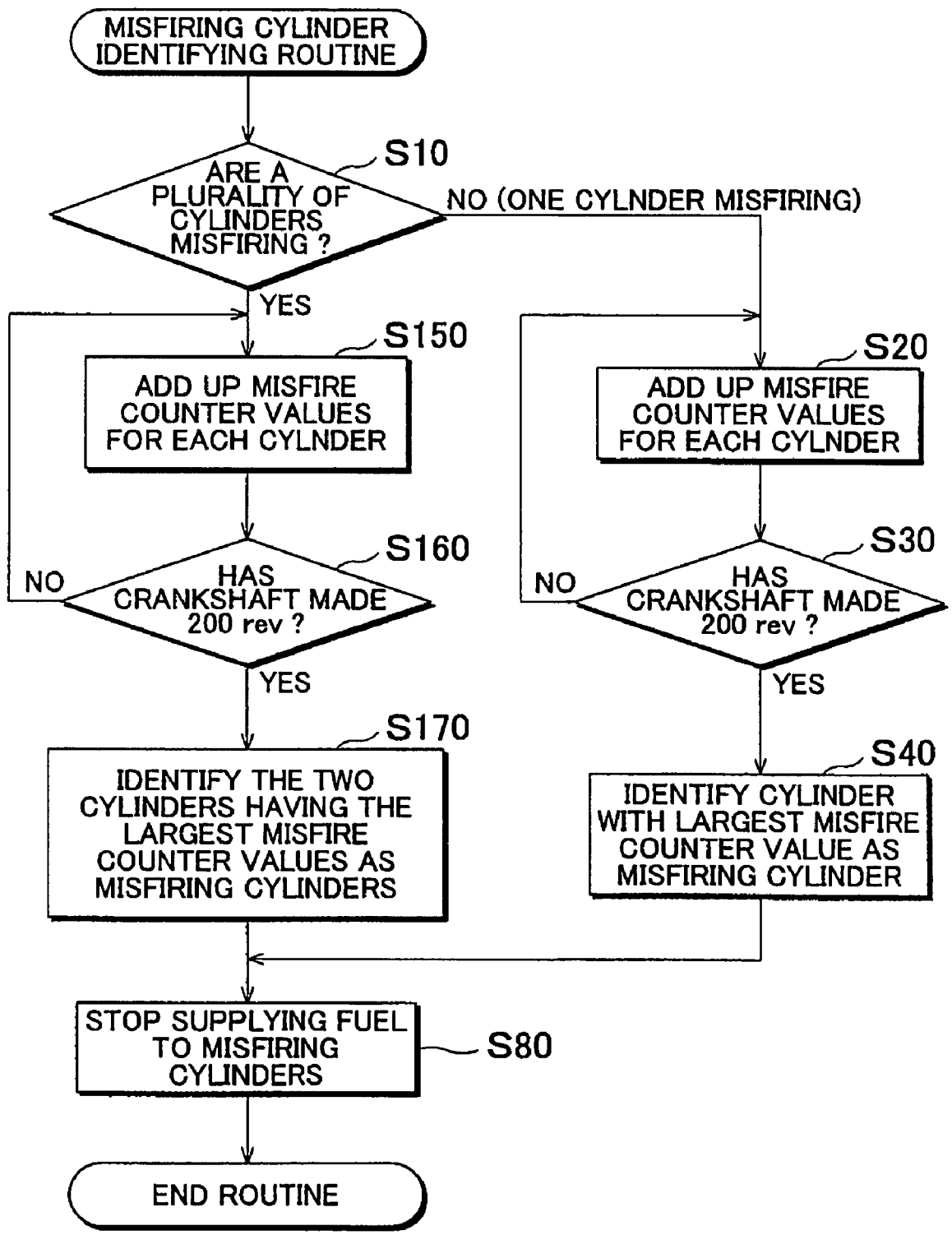
FIG. 6 is a flowchart of a misfiring cylinder identifying routine employed by a multiple cylinder internal combustion engine misfiring cylinder identifying apparatus according to a second example embodiment of the invention.

FIG. 6 is a flowchart illustrating a misfiring cylinder identifying routine employed in this second example embodiment. This routine is also executed by the ECU 23 when misfiring has been confirmed. Also, the processes of steps S10 to S40 and S80 in this routine are the same as they are in the routine in the first example embodiment shown in FIG. 4.

In the second example embodiment, if it is determined in step S10 that a plurality of cylinders is misfiring, the ECU 23 adds up the misfire counter values in each of the cylinders #1 to #8 during 200 revolutions of the crankshaft 21 in steps S150 and S160. That is, the ECU 23 at this time counts the number of times the revolution speed fluctuation amount DLTFL of each cylinder #1 to #8 exceeds the misfire determining value LVMF during 200 revolutions of the crankshaft 21, and stores that number in a misfire counter for each cylinder. Then in step S170, the ECU 23 identifies the two cylinders that have the largest misfire counter values as the misfiring cylinders, and in step S80 the ECU 23 stops the supply of fuel to the identified misfiring cylinders. Then this cycle of the routine ends.

In the second example embodiment described above, the process performed by the ECU 23 in step S10 of the misfiring cylinder identifying routine may be regarded as a process performed by "determining means for determining whether a single cylinder is misfiring or a plurality of cylinders is misfiring" of the invention. Also, the processes performed by the ECU 23 in steps S150 to S170 of the misfiring cylinder identifying routine may be regarded as processes performed by "identifying means for identifying the two cylinders in the order of the revolution speed fluctuation from largest when it is determined by the determining means that a plurality of cylinders is misfiring" of the invention.

The multiple cylinder internal combustion engine misfiring cylinder identifying apparatus according to this example embodiment described above yields the following effects in addition to the effects from the first example embodiment described above. In the second example embodiment, the ECU 23 counts the number of times the revolution speed fluctuation amount exceeds the specified misfire determining value LVMF for each cylinder during a specified number of cycles, and determines the magnitude of the revolution speed fluctuation of each cylinder from the number of times counted. Accordingly, the misfiring cylinders when a plurality of cylinders is misfiring can be identified using the simple logic of counting the number of times the revolution speed fluctuation amount exceeds the specified misfire determining value LVMF and identifying the two cylinders for which the number of times counted is the largest as the misfiring cylinders.

In the first and second example embodiments, the misfiring cylinders are identified while stochastically ignoring simultaneous misfiring in three or more cylinders. However, depending on the case, the misfiring cylinders can also be identified when three or more cylinders are misfiring simultaneously. A multiple cylinder internal combustion engine misfiring cylinder identifying apparatus according to a third example embodiment of the invention is able to identify the misfiring cylinders not only when one or two cylinders are misfiring, but also when three cylinders are misfiring.

In order to identify which cylinders are misfiring, it is necessary to determine how many cylinders are misfiring. Here, the number of misfiring cylinders is determined by one of the following two determining methods.

One method determines the number of misfiring cylinders based on a comparison of the integrated value of the revolution speed fluctuation amount DLTFL of all of the cylinders in a specified number of cycles and a determining value set for each number of misfiring cylinders. As the number of misfiring cylinders increases so too does the revolution speed fluctuation amount of the internal combustion engine. Therefore, the number of misfiring cylinders can be determined based on a comparison of the integrated value of the revolution speed fluctuation amount DLTFL of all of the cylinders in a specified number of cycles and the determining value set for each number of misfiring cylinders. For example, if the integrated value of the revolution speed fluctuation amount DLTFL of all of the cylinders in a specified number of cycles is equal to or greater than a first determining value but below a second determining value (which is greater than the first determining value), it is determined that only one cylinder is misfiring. If that integrated value is equal to or greater than the second determining value but below a third determining value (which is greater than the second determining value), it is determined that two cylinders are misfiring. If that integrated value is equal to or greater than the third determining value, it is determined that three cylinders are misfiring.

Alternatively, another method determines the number of misfiring cylinders based on the fuel injection quantity and/or the intake air amount when the multiple cylinder internal combustion engine is operating under specified operating conditions. If the number of misfiring cylinders increases, more torque per unit cylinder is needed to obtain a constant engine output so the fuel injection quantity and the intake air amount when the multiple cylinder internal combustion engine is operated under specific operating, conditions increase each time the number of misfiring cylinders increases. As a result, it is possible to determine the number of misfiring cylinders from the fuel injection quantity and/or the intake air amount under those conditions. For example, the number of misfiring cylinders can be determined based on the fuel injection quantity and/or the intake air amount when the engine is idling, during which time feedback control is performed with respect to the intake air amount and the fuel injection quantity in order to keep the engine speed at a specified idle speed when generally no load is being applied. Also, the number of misfiring cylinders can similarly be determined based on the fuel injection quantity and/or the intake air amount when the vehicle speed is being maintained at a specific vehicle speed by the driver operating the accelerator while a vehicle which uses a multiple cylinder internal combustion engine as the prime mover is running on a flat road. In this case, when the integrated value of the fuel injection quantity and/or the intake air amount under these conditions is equal to or greater than a first determining value but below a second determining value (which is greater than the first determining value), it is determined that a single cylinder is misfiring. If that integrated value is equal to or greater than the second determining value but below a third determining value (which is greater than the second determining value), it is determined that two cylinders are misfiring. If that integrated value is equal to or greater than the third determining value, it is determined that three cylinders are misfiring.

Once the number of cylinders that are misfiring are determined in this way, the misfiring cylinders can be easily identified based on the integrated value of the revolution speed fluctuation amount DLTFL or the value of the misfire counter as described above. That is, if the number of misfiring cylinders is determined to be "n", then the integrated value of the revolution speed fluctuation amount in a specified number of cycles can be obtained for each cylinder and the "n" number of cylinders with the largest integrated values can be identified as the misfiring cylinders. Alternatively, the number of times the revolution speed fluctuation amount exceeds the specified misfire determining value LVMF can be counted for each cylinder, and the "n" number of cylinders with the most number of times counted can be identified as the misfiring cylinders.

Figure 7:
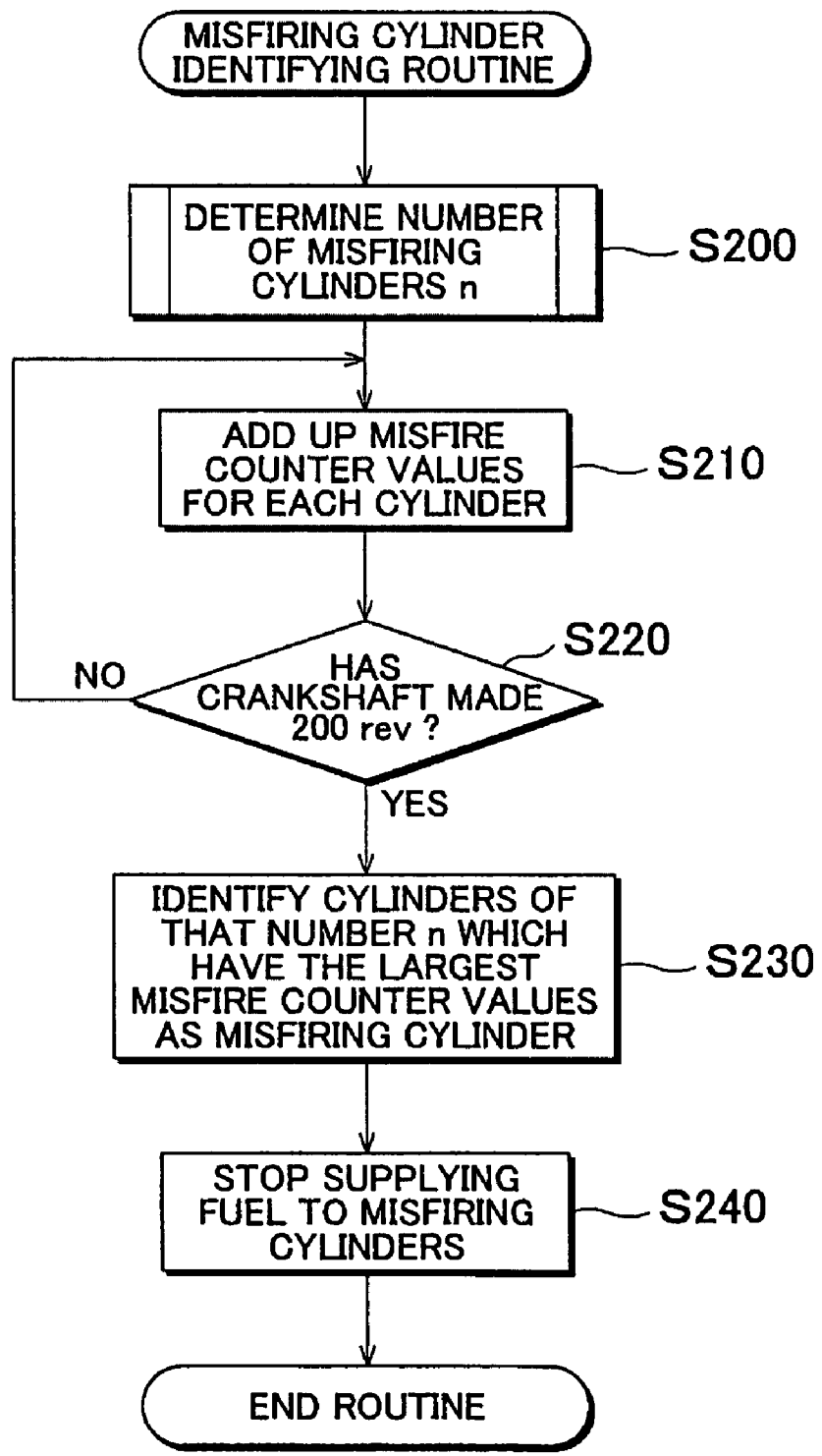
FIG. 7 is a flowchart of a misfiring cylinder identifying routine employed by a multiple cylinder internal combustion engine misfiring cylinder identifying apparatus according to a third example embodiment of the invention.

FIG. 7 is a flowchart illustrating an example of a misfiring cylinder identifying routine employed in this third example embodiment. This routine is executed by the ECU 23 when misfiring has been confirmed. Incidentally, the flowchart in FIG. 7 shows the sequence of steps when identifying the misfiring cylinder(s) using the misfire counter. Alternatively, however, the misfiring cylinder(s) may also be identified using the integrated value of the revolution speed fluctuation amount DLTFL for each cylinder as described above.

When this routine starts, first in step S200 the ECU 23 determines the number of misfiring cylinders n according to one of the two methods described above. Once the number of misfiring cylinders n has been determined, the ECU 23 then adds up the misfire counter values for each cylinder #1 to #8 during 200 revolutions (rev) of the crankshaft 21 in steps S210 and S220. That is, the ECU 23 at this time counts the number of times the revolution speed fluctuation amount DLTFL of each cylinder #1 to #8 exceeds the misfire determining value LVMF for each cylinder and stores that number in the misfire counter for each cylinder. Then in step S230, the ECU 23 identifies the "n" number of cylinders with the largest misfire counter values as the misfiring cylinders and in step S240 the ECU 23 stops the supply of fuel to the identified misfiring cylinders, after which this cycle of the routine ends.

Incidentally in the third example embodiment described above, the process performed by the ECU 23 in step S200 of the misfiring cylinder identifying routine may be regarded as a process performed by "determining means for determining the number of misfiring cylinders" of the invention. Also, the processes performed by the ECU 23 in steps S210 to S230 of the misfiring cylinder identifying routine may be regarded as processes performed by "identifying means for identifying the misfiring cylinders the misfiring cylinders corresponding to the number of misfiring cylinders in the order of the revolution speed fluctuation from largest when it is determined that a plurality of cylinders is misfiring" of the invention.

The multiple cylinder internal combustion engine misfiring cylinder identifying apparatus according to the third example embodiment described above yields the following effects. In the third example embodiment, the ECU 23 determines the number of misfiring cylinders and identifies the misfiring cylinders corresponding to the number of misfiring cylinders in the order of the revolution speed fluctuation from largest. That is, when identifying the misfiring cylinders, the ECU 23 first only determines the number of cylinders that are misfiring, i.e., the number of misfiring cylinders. The number of misfiring cylinders can be determined relatively easily if not identifying the misfiring cylinder(s). Once the number of misfiring cylinders has been determined, the misfiring cylinders can be identified using simple logic. In the third example embodiment, by first determining the number of misfiring cylinders and then identifying those misfiring cylinders, i.e., by performing these steps separately in this way, it is possible to identify misfiring cylinders using only simple logic, regardless of whether only one cylinder is misfiring or a plurality of cylinders is misfiring. Therefore this third example embodiment makes it possible to identify a misfiring cylinder(s) in a multiple cylinder internal combustion engine using only relatively simple logic.

Also, in this example embodiment, after the number of misfiring cylinders n has been determined the ECU 23 counts the number of times the revolution speed fluctuation amount exceeds the specified misfire determining value LVMF during a specified number of cycles with a misfire counter set for each cylinder. Then the ECU 23 determines the magnitude of the revolution speed fluctuation of each cylinder #1 to #8 from the number of times counted and identifies the cylinders of that number n (i.e., the number of misfiring cylinders n) in the order of the revolution speed fluctuation from largest, or more specifically, with the highest the misfire counter values. Therefore, the misfiring cylinders can be identified with simple logic after the number of misfiring cylinders n has been determined. Incidentally, after the number of misfiring cylinders n has been determined, the misfiring cylinders can be identified by obtaining the integrated value of the revolution speed fluctuation amount DLTFL in a specified number of cycles for each cylinder, and determining the magnitude of the revolution speed fluctuation of each cylinder from the size of that integrated value. In this case, cylinders of the number of misfiring cylinders n having the highest integrated values can be identified as the misfiring cylinders. In this case as well, the misfiring cylinders can be identified using simple logic after the number of misfiring cylinders n has been determined.

Furthermore, in the third example embodiment, the number of misfiring cylinders n is determined either based on a comparison between the integrated values of the revolution speed fluctuation amounts of all of the cylinders in a specified number of cycles and the determining value set for each number of misfiring cylinders, or the fuel injection quantity and/or the intake air amount when the multiple cylinder internal combustion engine is operating under specified operating conditions. Accordingly, the number of misfiring cylinders n can be appropriately determined.

Incidentally, the example embodiments described above may also be modified as follows. For example, in the third example embodiment, the number of misfiring cylinders 11 is determined by one of the two methods described above. Alternatively, however, as long as there is appropriate logic for determining the number of misfiring cylinders n, the number of misfiring cylinders n may also be determined by a method other than the two methods described above.

Also, in the first and second example embodiments, the determination as to whether one or a plurality of cylinders is misfiring is made based on the revolution speed fluctuation pattern. Alternatively, however, as long as there is appropriate logic for making that, determination, that determination can also be made using that logic. That is, as long as there is logic that makes it possible to determine whether a misfire is occurring in only one cylinder, it is possible to employ appropriate logic as logic related to determining whether a single cylinder is misfiring or a plurality of cylinders is misfiring.

In the example embodiments described above, the misfiring cylinders are identified by determining the magnitude of the revolution speed fluctuation of each cylinder #1 to #8 from the integrated value of the revolution speed fluctuation amount DLTFL or the misfire counter value. Alternatively, however, as long as there is appropriate logic for ascertaining the magnitude of the revolution speed fluctuation of each cylinder #1 to #8, the misfiring cylinders may instead be identified based on the magnitude of the revolution speed fluctuation ascertained according to such logic.

In the example embodiments described above, the revolution speed fluctuation amount DLTFL of each cylinder #1 to #8 is calculated according to Equation 1 above. Alternatively, however, other appropriate logic related to calculating the revolution speed fluctuation amount DLTFL can also be used. That is, if there is separate calculating logic that is suitable for calculating the revolution speed fluctuation amount DLTFL, the revolution speed fluctuation amount DLTFL may also be calculated using that logic instead of according to Equation 1 described above.

In the example embodiments described above, the invention is applied to a misfiring cylinder identifying apparatus of a V-type eight-cylinder internal combustion engine. However, the invention may similarly be applied to a misfiring cylinder identifying apparatus of different type multiple cylinder internal combustion engine.

In the example embodiments described above, the invention is applied to a spark ignition multiple cylinder internal combustion engine in which fuel is ignited by spark discharge using the spark plug 19. However, the invention may similarly be applied as an apparatus that identifies a misfiring cylinder(s) in a compression ignition multiple cylinder internal combustion engine.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the claimed invention.

What is claimed is:

1. A misfiring cylinder identifying apparatus for a multiple cylinder internal combustion engine, comprising:
    a determining portion that determines whether a plurality of cylinders is misfiring and whether only a single cylinder is misfiring; and
    an identifying portion that,
    after the determining portion determines that a plurality of cylinders is misfiring, identifies two cylinders among the plurality of cylinders in the order of the revolution speed fluctuation from largest as the misfiring cylinders and,
    after the determining portion determines that only a single cylinder is misfiring, identifies a single cylinder with a largest revolution speed fluctuation as the single misfiring cylinder.

2. The misfiring cylinder identifying apparatus according to claim 1, wherein the identifying portion obtains an integrated value of a revolution speed fluctuation amount in a specified number of cycles for each cylinder, and determines the magnitude of the revolution speed fluctuation of each cylinder based on the integrated value.

3. The misfiring cylinder identifying apparatus according to claim 1, wherein the identifying portion counts the number of times the revolution speed fluctuation amount exceeds a specified misfire determining value during a specified number of cycles for each cylinder, and determines the magnitude of the revolution speed fluctuation of each cylinder based on the number of times counted.

4. The misfiring cylinder identifying apparatus according to claim 1, wherein the determining portion determines whether a plurality of cylinders is misfiring based on a pattern of the revolution speed fluctuation of all of the cylinders.

5. The misfiring cylinder identifying apparatus according to claim 1, wherein the identifying portion counts the number of times the revolution speed fluctuation amount exceeds a specified misfire determining value for each cylinder during a specified number of cycles, and identifies the cylinder having the largest number of times counted as the misfiring cylinder when it is determined that a single cylinder is misfiring.

6. A misfiring cylinder identifying apparatus for a multiple cylinder internal combustion engine, comprising:
a determining portion that determines the number of misfiring cylinders; and
an identifying portion that,
after the determining portion determines that the number of misfiring cylinder is greater than one, identifies the misfiring cylinders corresponding to the number of misfiring cylinders in the order of the revolution speed fluctuation from largest as the misfiring cylinders and
after the determining portion determines that the number of misfiring cylinders is one, identifies a single cylinder with a largest revolution speed fluctuation as the misfiring cylinder.

7. The misfiring cylinder identifying apparatus according to claim 6, wherein the identifying portion obtains an integrated value of a revolution speed fluctuation amount in a specified number of cycles for each cylinder, and determines the magnitude of the revolution speed fluctuation of each cylinder based on the integrated value.

8. The misfiring cylinder identifying apparatus according to claim 6, wherein the identifying portion counts the number of times the revolution speed fluctuation amount exceeds a specified misfire determining value during a specified number of cycles for each cylinder, and determines the magnitude of the revolution speed fluctuation of each cylinder based on the number of times counted.

9. The misfiring cylinder identifying apparatus according to claim 6, wherein the determining portion determines the number of misfiring cylinders based on a comparison of an integrated value of the revolution speed fluctuation amount in a specific number of cycles and a determining value which is set for each number of misfiring cylinders.

10. The misfiring cylinder identifying apparatus according to claim 9, wherein:
the determining portion determines that a single cylinder is misfiring when the integrated value of the revolution speed fluctuation amount in the specified number of cycles is equal to or greater than a first determining value but below a second determining value;
the determining portion determines that two cylinders are misfiring when the integrated value of the revolution speed fluctuation amount in the specified number of cycles is equal to or greater than the second determining value but below a third determining value; and
the determining portion determines that three cylinders are misfiring when the integrated value of the revolution speed fluctuation amount in the specified number of cycles is equal to or greater than the third determining value.

11. The misfiring cylinder identifying apparatus according to claim 6, wherein the determining portion determines the number of misfiring cylinders based on at least one of a fuel injection quantity and an intake air amount when the multiple cylinder internal combustion engine is operating under a specified condition.

12. A method for identifying a misfiring cylinder in a multiple cylinder internal combustion engine, comprising:
determining whether a plurality of cylinders is misfiring and whether only a single cylinder is misfiring by a processor; and
identifying the misfiring cylinders by
after it is determined that a plurality of cylinders is misfiring, identifying two cylinders among the plurality of cylinders in the order of the revolution speed fluctuation from largest as the misfiring cylinders, and
after it is determined that only a single cylinder is misfiring, identifying a single cylinder with a largest revolution speed fluctuation as the single misfiring cylinder.

* * * * *